United States Patent
Tix et al.

(10) Patent No.: US 9,810,361 B2
(45) Date of Patent: Nov. 7, 2017

(54) POUR SPOUT ADAPTER ASSEMBLY FOR PUMPING SYSTEM

(75) Inventors: Joseph E. Tix, Hastings, MN (US); Christopher J. Pellin, Burnsville, MN (US); Mark T. Weinberger, Mounds View, MN (US); Andrew M. Spiess, Forest Lake, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 8 days.

(21) Appl. No.: 14/125,394

(22) PCT Filed: Jun. 19, 2012

(86) PCT No.: PCT/US2012/043156
§ 371 (c)(1),
(2), (4) Date: Dec. 11, 2013

(87) PCT Pub. No.: WO2012/177645
PCT Pub. Date: Dec. 27, 2012

(65) Prior Publication Data
US 2014/0124050 A1  May 8, 2014

Related U.S. Application Data

(60) Provisional application No. 61/498,982, filed on Jun. 20, 2011.

(51) Int. Cl.
*F16L 39/00* (2006.01)
*F16L 19/02* (2006.01)
(Continued)

(52) U.S. Cl.
CPC .......... *F16L 39/00* (2013.01); *F16L 19/0225* (2013.01); *F04B 15/02* (2013.01); *F04B 17/06* (2013.01);
(Continued)

(58) Field of Classification Search
CPC ..... F16L 37/088; F16L 39/00; F16L 19/0225; F04B 53/16; F04B 19/04; F04B 17/06;
(Continued)

(56) References Cited

U.S. PATENT DOCUMENTS 1,697,217 A    1/1929  Zerk
3,724,489 A *  4/1973  Eross ............................ 137/322
(Continued)

FOREIGN PATENT DOCUMENTS

TW           385 608 U       8/2010

OTHER PUBLICATIONS

International Search Report and Written Opinion from PCT Application Serial No. PCT/US2012/043156, dated Jan. 14, 2013, 9 pages.
(Continued)

*Primary Examiner* — Gregory Binda
*Assistant Examiner* — Zachary Dragicevich
(74) *Attorney, Agent, or Firm* — Kinney & Lange, P.A.

(57) ABSTRACT

A pour spout adapter comprises a housing, a collar and a threaded engagement. The housing has a sealed bore for receiving a tube. The collar has an internal bore coupled to the housing at a rotatable connection so as to permit a tube to extend from the sealed bore through the collar. The threaded engagement is disposed on the internal bore to receive a threaded pour spout.

26 Claims, 7 Drawing Sheets

(51) Int. Cl.
*F04B 15/02* (2006.01)
*F04B 17/06* (2006.01)
*F04B 19/04* (2006.01)
*F04B 53/16* (2006.01)

(52) U.S. Cl.
CPC .............. *F04B 19/04* (2013.01); *F04B 53/16* (2013.01); *Y10T 137/598* (2015.04)

(58) Field of Classification Search
CPC ....... F04B 15/02; B65D 39/084; B65D 47/06; B65D 47/122; F16K 43/00
USPC ..... 222/567, 569, 570; 285/124.1, 201, 386, 285/387, 94, 96, 106; 137/315.01
See application file for complete search history.

(56) References Cited

U.S. PATENT DOCUMENTS

| | | | | |
|---|---|---|---|---|
| 4,129,236 A | * | 12/1978 | Wrycraft | B65D 47/14 220/320 |
| 4,199,153 A | * | 4/1980 | Martin | 366/139 |
| 4,548,344 A | | 10/1985 | Hestehave et al. | |
| 4,595,217 A | * | 6/1986 | Siegel | F16L 25/14 285/12 |
| 4,763,676 A | * | 8/1988 | Mizuno | 134/100.1 |
| 4,834,825 A | * | 5/1989 | Adams et al. | 156/294 |
| 5,199,613 A | * | 4/1993 | Magrath et al. | 222/153.09 |
| 5,641,099 A | | 6/1997 | McLelland et al. | |
| 6,220,482 B1 | * | 4/2001 | Simmel et al. | 222/83 |
| 6,230,944 B1 | * | 5/2001 | Castellano | B65D 47/243 222/481.5 |
| 6,478,058 B1 | * | 11/2002 | Pears | B65D 25/48 141/255 |
| 2003/0183662 A1 | | 10/2003 | Ingram | |
| 2006/0125231 A1 | * | 6/2006 | Frasch | F16L 19/02 285/52 |
| 2011/0220687 A1 | * | 9/2011 | Schneider et al. | 222/566 |
| 2012/0280001 A1 | * | 11/2012 | Leadbeater | B65D 25/44 222/481.5 |

OTHER PUBLICATIONS

Taiwan Office Action for Taiwan Patent Application No. 101122090, dated Jan. 26, 2016, 7 pages.

* cited by examiner

POUR SPOUT ADAPTER ASSEMBLY FOR PUMPING SYSTEM

BACKGROUND

The present invention relates generally to fluid pumping systems and more particularly to adapters for connecting containers to pump inlets.

Fluid proportioners comprise dispensing systems that receive separate inert liquid component materials, mix the component materials in a predetermined ratio and then dispense the component materials as an activated compound. For example, fluid proportioners are used to dispense polyurethanes or polyureas that solidify after mixing of a resin component and an activating material, which are individually inert. After mixing, however, an immediate chemical reaction begins taking place that results in expanded, rigid or non-rigid, plastic foam or a flexible, cured thermoplastic polyurea coating of the mixture. Therefore, the two component materials are routed separately into the proportioner so that they can remain segregated as long as possible. A manifold receives each component material after it is pumped separately, and feeds the component materials to a sprayer including a mixing head that can be actuated by an operator. Thus, the component materials remain segregated until reaching the sprayer where they are simultaneously mixed and dispensed, thereby minimizing potential for fouling of components.

A typical fluid proportioner comprises a pair of positive displacement component pumps that are typically driven in synchronicity by a common electric motor. Each pump individually draws in a liquid component material from a separate fluid container and pumps the pressurized liquid component material to the manifold. In small, portable pump systems, the pump inlets are typically coupled to standard sized containers, such as five-gallon buckets. For example, a typically pump system utilizes a hollow tube that is inserted into a pour spout of a lid for the liquid component material bucket, and connected to the pump inlet with a flexible hose. The hollow tube is, however, loosely positioned in the pour spout so as to allow for the potential leakage of the liquid component material from the bucket and entry of debris into the bucket. As such, there is a need for an improved fluid container coupling assembly for use in pumping systems.

SUMMARY

The present invention is directed to an adapter for connecting a pump to a pour spout of a fluid container. The pour spout adapter comprises a housing, a collar and a threaded engagement. The housing has a sealed bore for receiving a tube. The collar has an internal bore coupled to the housing at a rotatable connection so as to permit a tube to extend from the sealed bore through the collar. The threaded engagement is disposed on the internal bore to receive a threaded pour spout.

DETAILED DESCRIPTION

Figure 1A:
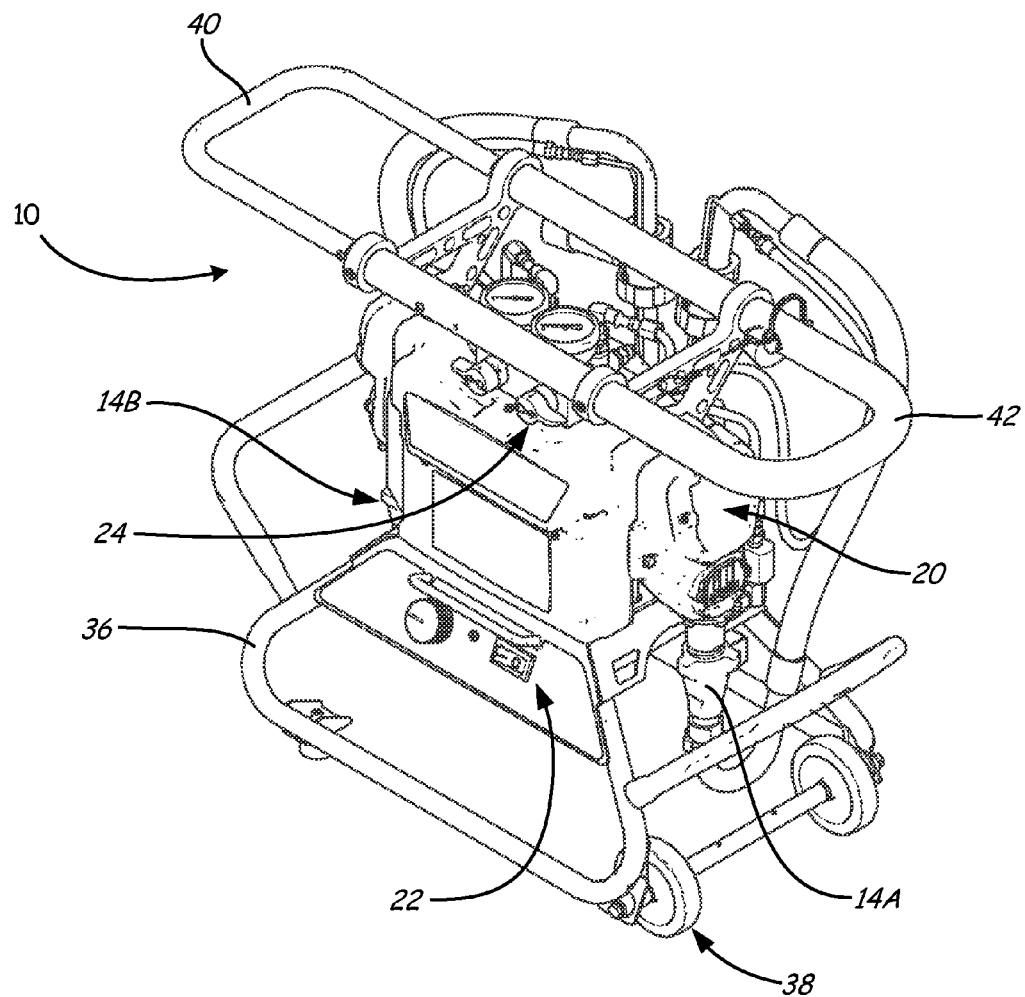
FIG. 1A is a front perspective view of a portable dual-component proportioner system having pour spout adapter assemblies of the present invention.
Figure 1B:
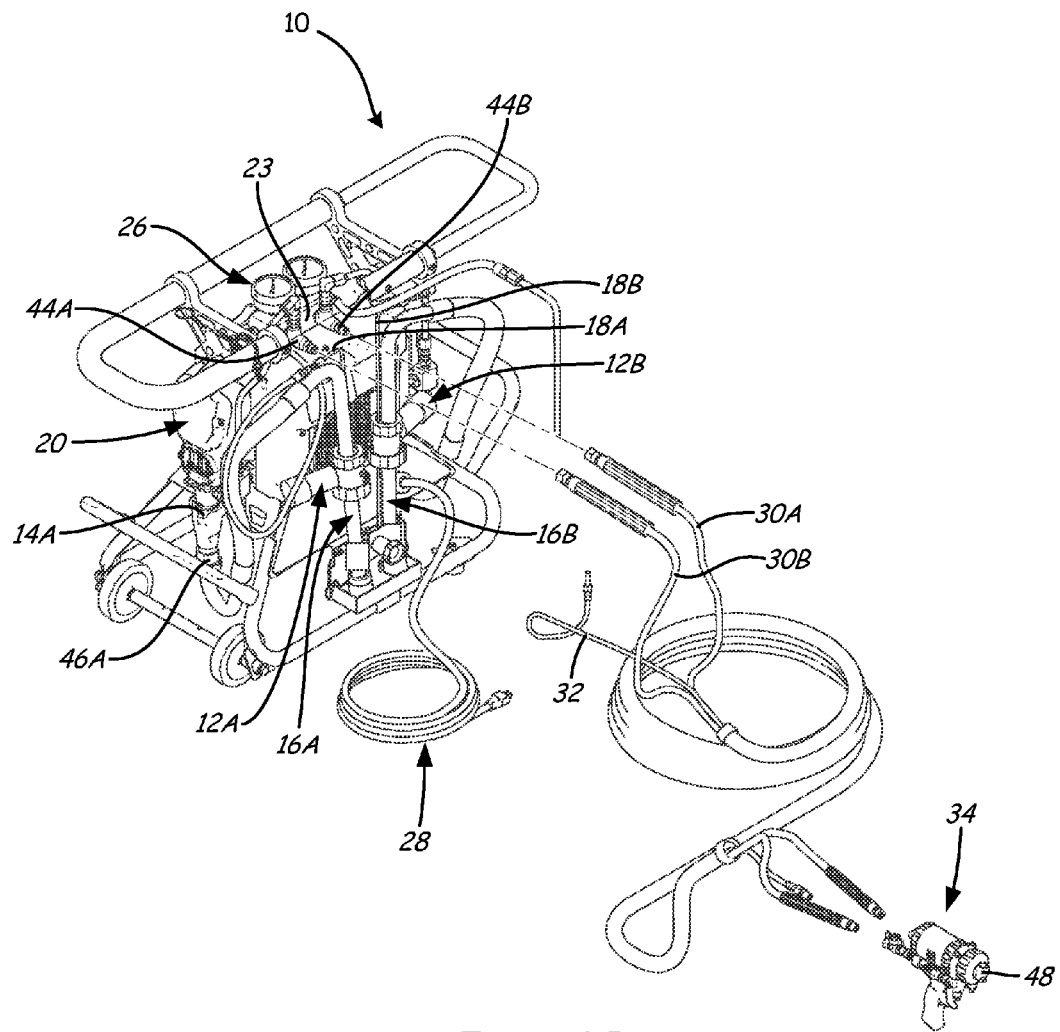
FIG. 1B is a rear perspective view of a portable dual-component proportioner system having pour spout adapter assemblies of the present invention.
Figure 2:
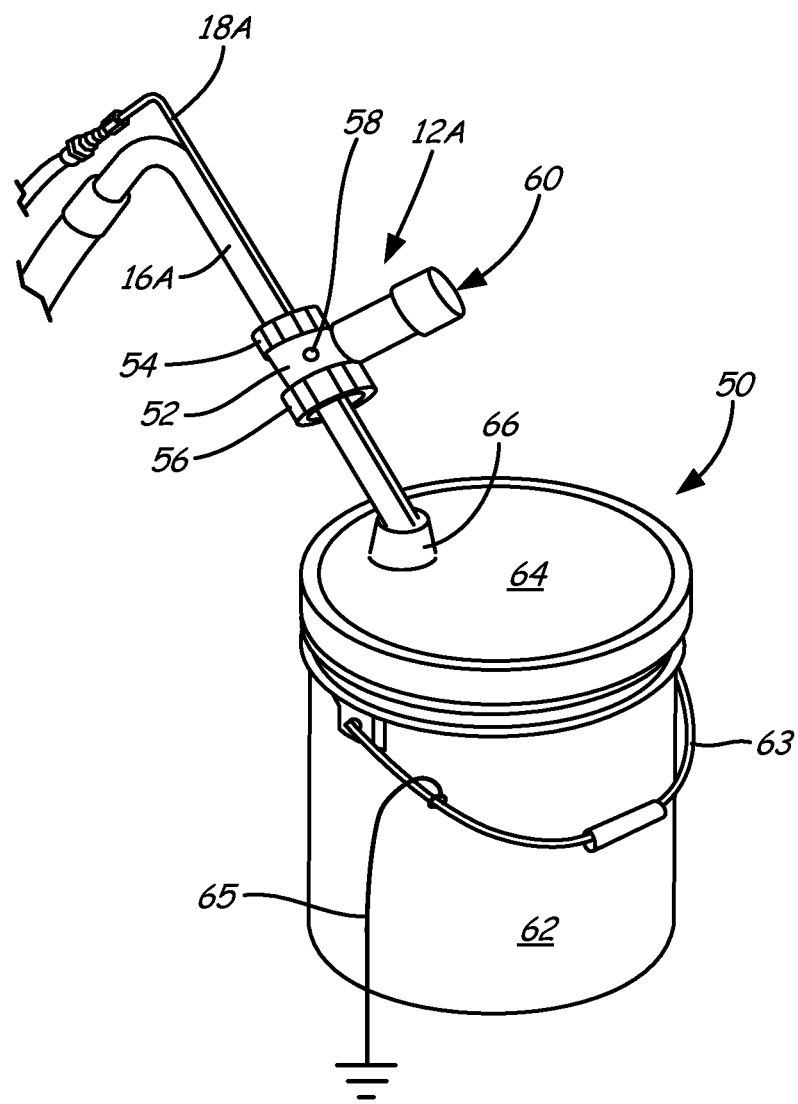
FIG. 2 is a perspective view of a pour spout adapter assembly of FIGS. 1 & 2 connected to a fluid inlet tube and return tube that are partially inserted into a component material container.

FIG. 1A is a front perspective view and FIG. 1B is a rear perspective view of portable dual-component proportioner system 10 having pour spout adapter assemblies 12A and 12B of the present invention. FIGS. 1 & 2 are discussed concurrently. Proportioner system 10 includes pumps 14A and 14B, fluid inlet tubes 16A and 16B, return tubes 18A and 18B, motor 20, control panel 22, manifold 23, valves 24 and pressure gauges 26. Proportioner system 10 also includes power cord 28, component lines 30A and 30B, air line 32 and dispenser 34. Proportioner system 10 is mounted on frame 36, which includes wheels 38 and handle 40 for ease of portability. Frame 36 also includes hose rack 42 upon which power cord 28, component lines 30A and 30B and air line 32 can be wound.

To operate system 10, power cord 28 is unwound and plugged into an electrical power source. Component lines 30A and 30B are coupled to dispenser 34 and outlet adapters 44A and 44B on manifold 23. Air line 32 is connected to dispenser 34 and an external source of compressed air, which may be routed through manifold 23 to dispenser 34. First ends of fluid inlet tubes 16A and 16B are fluidly coupled to inlets, such as inlet 46A) of pumps 14A and 14B, respectively. First ends of return tubes 18A and 18B are fluidly coupled to outlet adapters 44A and 44B on manifold 22. Second ends of fluid inlet tubes 16A and 16B and return tubes 18A and 18B are inserted into pour spout adapter assemblies 12A and 12B, respectively, for coupling with separate fluid containers (not shown). Note that tubes 16A and 16B and tubes 18A and 18B are shown in FIG. 1B in stowed positions, but can be unsecured and extended from frame 36 for linking to fluid containers. Pour spout adapter assemblies 12A and 12B are coupled to pour spouts of the fluid containers that contain liquid component materials for mixing and dispensing with system 10.

System 10 is turned on using an appropriate power switch at control panel 22 that provides power from power cord 28 to motor 20. Motor 20 is activated to provide mechanical power to pumps 14A and 14B. In the disclosed embodiment, motor 20 comprises an electric motor powered by power cord 28. Motor 20 provides rotational power to pumps 14A and 14B, which is converted to a reciprocating motion that draws liquid component materials from the fluid containers through fluid inlet tubes 16A and 16B. In the disclosed embodiment, pumps 14A and 14B dispense two components in a 1:1 ratio. Gauges 26 provide an indication of the fluid pressure of the component materials generated by pumps 14A and 14B. An operator of system 10 can adjust the pressure at control panel 22 using appropriately provided control knobs. Component materials from fluid inlet tubes 16A and 16B are pumped to dispenser 34 through component lines 30A and 30B. Dispenser 34 includes mix head 48, which individually receives each component material and mixes them at the point of departure from dispenser 34. Excess component material provided to manifold 23, beyond what is sprayed by dispenser 34, by pumps 14A and 14B is re-circulated to the fluid containers through outlet adapters 44A and 44B and return tubes 18A and 18B. Additionally, an operator of system 10 can set manifold 23 to re-circulate one-hundred percent of the component materials from pumps 14A and 14B for standby operation or, alternatively, for circulating a cleaning solvent through system 10.

The liquid component materials comprise first and second viscous fluids that, upon mixing, form a cured structure. For example, the first component material comprises a resin material, such as a blended polyol resin, and the second component material comprises a catalyst material that causes the resin material to harden, such as polymeric MDI (methylene diphenyl diisocyanate). Mixing of the component materials begins the solidification process, which completes when the mixed component materials are sprayed onto a desired surface. Such component materials are often sold and stored in standard containers, such as five-gallon buckets. The containers are typically fitted with lids having re-sealable pour spouts for accessing the liquid component material in the container. The pour spouts are typically closed-off and sealed with a threaded cap. Pour spout adapters assemblies 12A and 12B of the present invention are configured to join fluid inlet tubes 16A and 16B and return tubes 18A and 18B to conventional pour spouts in an air-tight fashion.

FIG. 2 is a perspective view of pour spout adapter assembly 12A of FIGS. 1A & 1B connected to fluid inlet tube 16A and return tube 18A, which are partially inserted into component material container 50. Pour spout adapter assembly 12A includes housing 52, cap 54, threaded collar 56, lubricant fitting 58 and air dryer 60. Component material container 50 includes bucket 62, lid 64, and pour spout 66. A liquid component material is stored in bucket 62. Lid 64 seals the liquid component material in bucket 62 for transportation and to keep contaminants out of bucket 62. Lid 64 includes pour spout 66, which permits the liquid component material to be easily pored from bucket 62 with lid 64 attached. Pour spout 66 is itself closed-off and sealed with a cap, typically through a threaded engagement. In one embodiment, pour spout 66 comprises a flexible tube of polymeric material that can be pushed into lid 64 to reduce its height so as to permit stacking of multiple containers 50. In one embodiment, pour spout 66 comprises a FLEX-SPOUT® pour spout commercially available from Rieke Packaging Systems of Auburn, Ind. In one embodiment, pour spout 66 comprises a pour spout as is described in U.S. Pat. No. 5,641,099, which is assigned to Rieke Corporation of Auburn, Ind.

Fluid inlet tube 16A and return tube 18A are inserted into pour spout adapter assembly 12A and through housing 52. Cap 54 seals against fluid inlet tube 16A and return tube 18A. At lubricant fitting 58, a lubricant can be injected into housing 52 to further seal around fluid inlet tube 16A and return tube 18A and to facilitate easy withdrawal of tubes 16A and 18A from cap 54. Pour spout 66 is extended from lid 64 and its cap is removed so that fluid inlet tube 16A and return tube 18A can be extended through lid 64 and into bucket 62. Bucket 62 is electrically grounded, such as by connecting metal handle 63 of bucket 62 to a grounded location with wire 65, as illustrated. Pour spout adapter assembly 12A is pushed into engagement with pour spout 66. Collar 56 includes internally located threads and is rotatable against housing 52 so as to be able to mate with and seal against external threads on pour spout 66. Air dryer 60 is coupled to a vent passageway extending through housing 52 that connects the inside of bucket 62 with surrounding ambient air in order to permit air to enter into bucket 62 to replace liquid component material consumed by pump system 10, thereby preventing formation of a vacuum within bucket 62. Air dryer 60 includes means, such as a desiccant, for removing moisture from air entering into the vent passageway, as is discussed with reference to FIG. 3.

Figure 3:
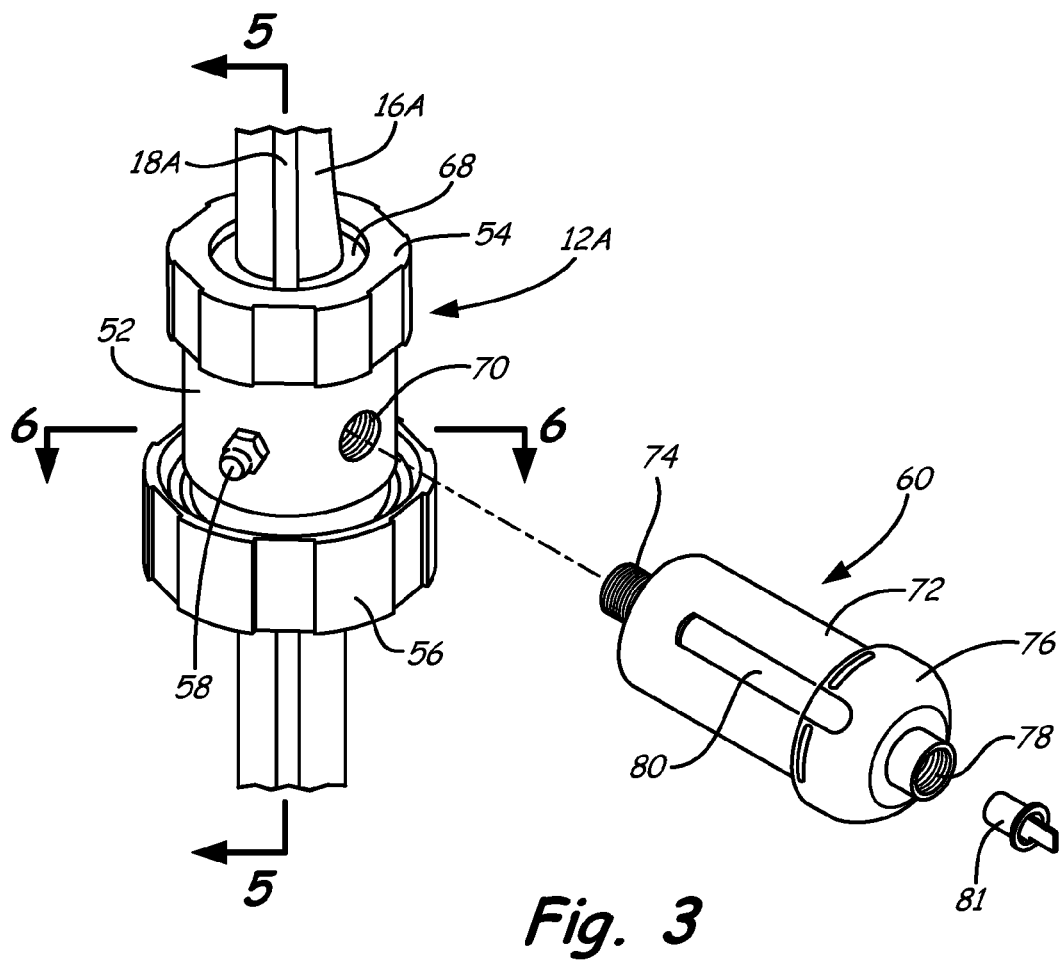
FIG. 3 is a perspective view of the pour spout adapter assembly of FIG. 2 connected to an air dryer.

FIG. 3 is a perspective view of pour spout adapter assembly 12A of FIG. 2 connected to air dryer 60. Pour spout adapter assembly 12A includes housing 52 to which cap 54 and collar 56 are attached. Pour spout adapter assembly 12A also includes crush plate 68, which is pressed against housing 52 by cap 54. Housing 52 includes lubricant fitting 58 and vent bore 70, to which air dryer 60 is coupled. Air dryer 60 includes tube 72, which includes coupler 74, and cap 76, which includes inlet bore 78.

Coupler 74 of tube 72 includes threads for mating with corresponding threads within vent bore 70. Tube 72 of air dryer 60 comprises a hollow body in which a desiccant, such as silica gel, is stored. Tube 72 includes indicator 80, which provides an operator with a visual representation of the condition of the desiccant. In another embodiment, indicator 80 simply comprises a window through which the desiccant can be viewed. Coupler 74 and inlet bore 78 align with each other to form a straight through-passage within air dryer 60. As such, air can pass into inlet bore 78, through the desiccant within tube 72, through coupler 74 and into housing 52. Inlet bore 78 includes threads. As such, coupler 74 and inlet bore 78 can be fitted with seal plugs, such as plug 81, to prevent ambient air from degrading the desiccant before being installed on pour spout adapter assembly 12A. In other embodiments of the invention, air dryer 60 can be replaced with a check valve that permits air flow into housing 52, but that prevents liquid component material from leaking out of vent bore 70.

Lubricant fitting 58 comprises a nipple onto which a dispenser for a supply of lubricant can be connected. Lubricant fitting 58 includes a small opening that is sealed by a spring-actuated ball bearing, which opens when pressurized lubricant is forced against fitting 58. In one embodiment, lubricant fitting 58 comprises a Zerk fitting, as is known in the art and described in U.S. Pat. No. 1,697,217 to Zerk.

Crush plate 68 includes bores for receiving fluid inlet tube 16A and return tube 18A, which align with corresponding holes in housing 52. Pour spout adapter assembly 12A includes O-ring seals that fit around fluid inlet tube 16A and return tube 18A between crush plate 68 and housing 52. Assembly of crush plate 68 with housing 52 pushes the O-rings against fluid inlet tube 16A and return tube 18A. Assembly of crush plate 68 and threaded collar 56 of pour spout adapter assembly 12A is further described with reference to FIGS. 4 and 5, while operations of vent bore 70 and lubricant fitting 58 are further described with reference to FIG. 6.

Figure 4:
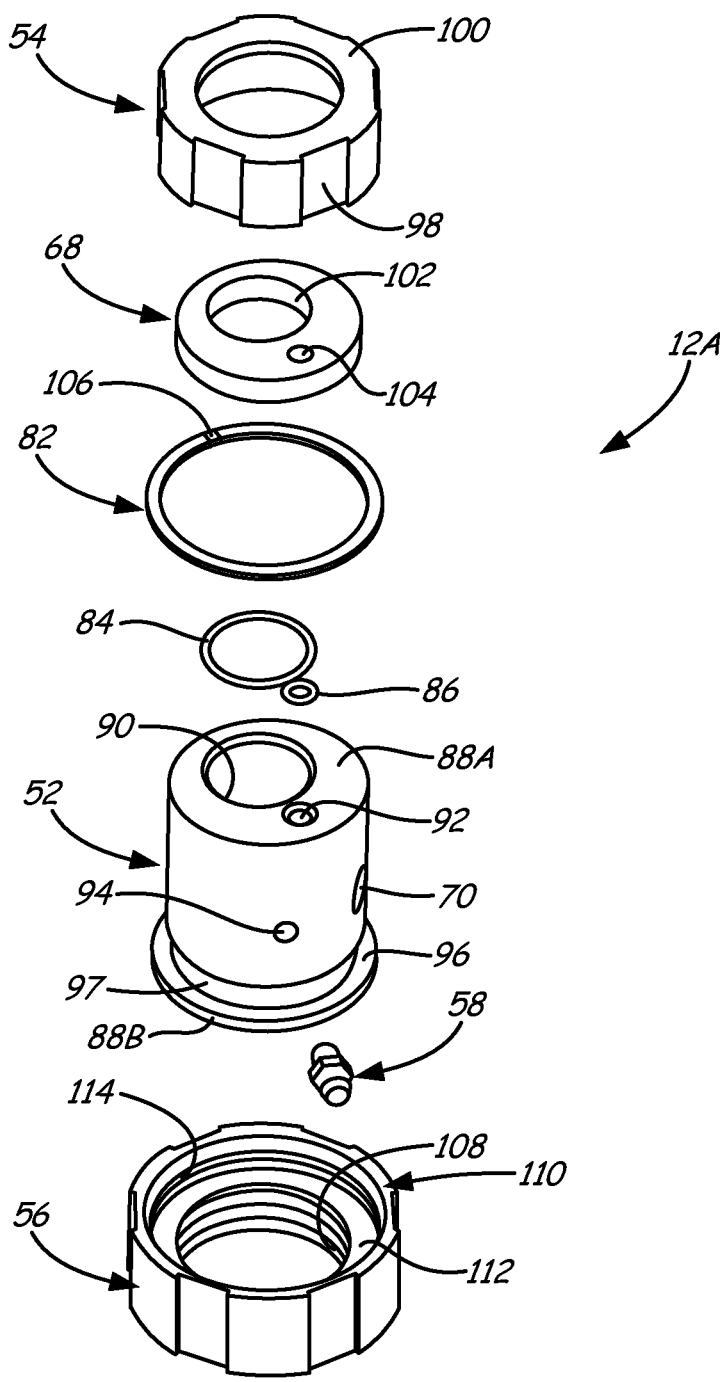
FIG. 4 is an exploded view of the pour spout adapter assembly of FIG. 3 showing a cap, crush plate, housing and threaded adapter.
Figure 5:
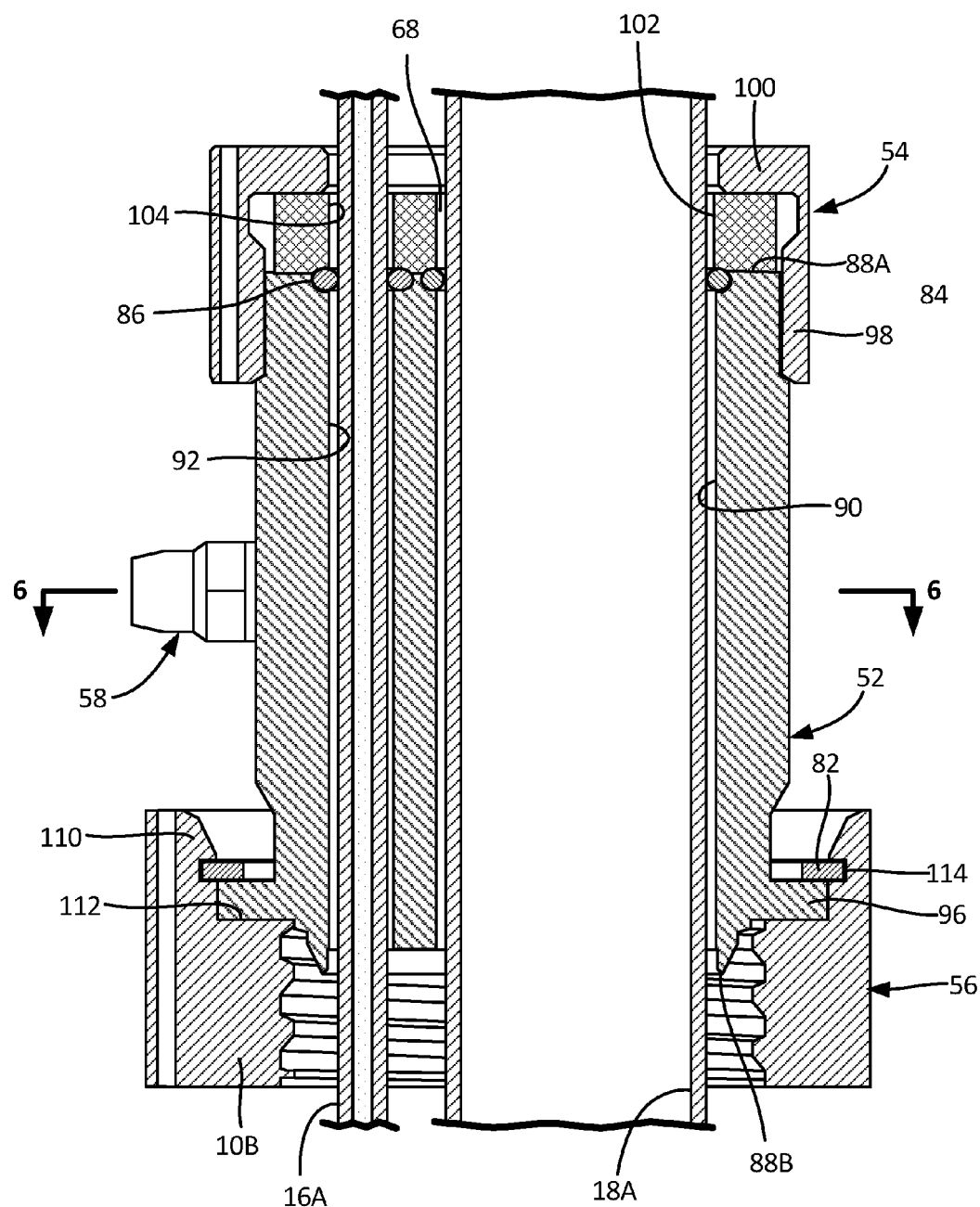
FIG. 5 is a longitudinal cross-sectional view of the pour spout adapter assembly taken at section 5-5 of FIG. 3 showing assembly of various components.

FIG. 4 is an exploded view of pour spout adapter assembly 12A of FIG. 3 showing cap 54, crush plate 68, housing 52 and threaded collar 56. FIG. 5 is a longitudinal cross-sectional view of pour spout adapter assembly 12A taken at section 5-5 of FIG. 3 showing assembly of cap 54, crush plate 68, housing 52 and threaded collar 56.

Pour spout adapter assembly 12A also includes snap ring 82, inlet O-ring 84 and return O-ring 86. Housing 52 comprises a body having first axial end 88A, second axial end 88B, inlet bore 90, return bore 92, lubricant passage 94, bearing flange 96, retainer groove 97 and vent bore 70. Cap 54 comprises annular tube 98 and flange 100. Crush plate 68 comprises a disk-like body having inlet bore 102 and return bore 104. Snap ring 82 comprises a flat ring having split 106 so as to allow snap ring 82 to deform. O-rings 84 and 86 comprise standard seals made of any suitable material and having any suitable cross-section. Lubricant fitting 58 comprises a Zerk fitting, or any other suitable fitting or coupler for joining to a lubricant dispenser. Threaded collar 56 comprises an annular nut having a first end with threaded bore 108, a second end with grooved flange 110, and bearing face 112.

In the described embodiment, housing 52 comprises a body having a cylindrical cross-section. Housing 52 may, however, have any cross-sectional shape, such as hexagonal, octagonal, rectangular, oval or square. Housing 52 extends axially to provide a length sufficient for fluid inlet tube 16A and fluid return tube 18A. Inlet bore 90 and return bore 92 extend all the way through housing 52 from first axial end 88A to second axial end 88B. Bores 90 and 92 are beveled to receive O-ring seals 84 and 86, respectively. First axial end 88A is generally planar to mate with crush plate 88A. Likewise, bearing flange 96 at second axial end 88B is generally planar to mate with bearing face 112 of threaded collar 56. As will be discussed with reference to FIG. 6, lubricant passage 94 extends into housing 50 to intersect inlet bore 90 and return bore 92, and vent bore 70 extends to intersect second axial end 88B. Lubricant fitting 58 is secured to lubricant passage 94 via any suitable means, such as a threaded engagement, welding or an adhesive. Fluid inlet tube 16A enters inlet bore 90 at first axial end 88A of housing 52 and exits inlet bore 90 at second axial end 88B of housing 52. Fluid return tube 18A enters return bore 92 at first axial end 88A of housing 52 and exits return bore 92 at second axial end 88B of housing 52.

Crush plate 68 is configured to mate with first axial end 88A of housing 52. For example, crush plate 68 has a diameter matching that of housing 52. Likewise, bores 102 and 104 within crush plate 68 match the diameters of bores 90 and 92 in housing 52, respectively. Crush plate 68 is of any sufficient thickness to provide a generally rigid body that can be used to uniformly deform O-ring seals 84 and 86. O-ring seals 84 and 86 are positioned within the bevels of bores 90 and 92 adjacent bores 102 and 104 of crush plate 68.

Cap 54 is joined to housing 52 to retain O-ring seals 84 and 86 between crush plate 68 and first axial end 88A of housing 52. The inner diameter of annular tube 98 is sized to receive housing 52. Annular tube 98 of cap 54 includes internal threads that mate with external threads (not shown) on housing 52. Annular tube 98 also includes external grooves or knurling to facilitate gripping and rotating of cap 54 by an operator of pour spout adapter assembly 12A. Flange 100 extends radially inward from annular tube 98 to extend over crush plate 68. Flange 100 extends sufficiently far to retain crush plate 68 without interfering with bores 102 and 104. Cap 54 is tightened down onto housing 52 such that crush plate 68 squeezes O-ring seals 84 and 86 against fluid inlet tube 16A and return tube 18A (FIG. 3).

The assemblage of cap 54, crush plate 68 and housing 52 is inserted into threaded collar 56. Specifically, second axial end 88B of housing 52 is inserted into grooved flange 110 until bearing flange 96 engages bearing face 112. Bearing flange 96 and bearing face 112 are smooth, flushly engaging surfaces that permit threaded collar to rotate against housing 52. Grooved flange 110 extends axially past bearing flange 96 and retainer groove 97. Retainer groove 97 comprises a reduction in the diameter of housing 52 immediately adjacent bearing flange 96. Retainer groove 97 permits snap ring 82 to be deformed at split 106 and pushed down inside grooved flange 110. Within grooved flange 110 snap ring 82 is permitted to expand into groove 114. As shown in FIG. 5, groove 114 is shallower than the width of snap ring 82 so as to overhang bearing flange 96 of housing 52, thereby rotatably holding housing 52 and threaded collar 56 in assembly. The exterior of threaded collar 56 includes external grooves or knurling to facilitate gripping and rotating of collar 56 by an operator of pour spout adapter assembly 12A. Thus, threaded bore 108 can be rotated and threaded onto pour spout 66 of component material container 50 (FIG. 2). As such, pour spout adapter assembly 12A can be readily coupled to standard component material containers utilizing threaded pour spouts.

Figure 6:
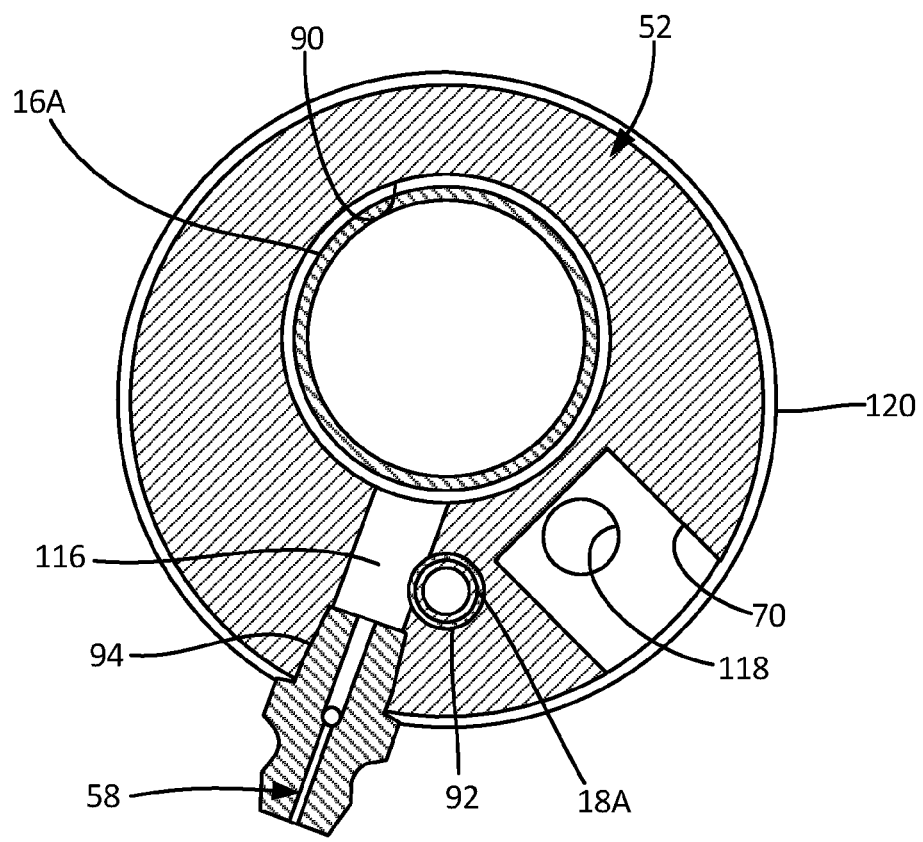
FIG. 6 is a lateral cross-sectional view of the pour spout adapter assembly taken at section 6-6 of FIG. 3 showing flow paths for a lubricant fitting and an air vent.

FIG. 6 is a lateral cross-sectional view of pour spout adapter assembly 12A taken at section 6-6 of FIG. 3 showing lubricant passage 116 for lubricant fitting 58 and air vent passage 118 for air dryer 60 (FIG. 3). As shown, inlet bore 90 extends through the interior of housing 52 offset from a center of housing 52 such that the wall thickness of housing 52 varies. As such, housing 52 takes on a cam-like shape when viewed in cross-section. Return bore 92 extends through the interior of housing 52. In the embodiment shown, return bore 92 extends through the thickest portion of housing 52.

Lubricant bore 94 extends into exterior surface 120 of housing 52 and includes threads for receiving lubricant fitting 58. Lubricant bore 94 coaxially extends into lubricant passage 116. In the embodiment shown, lubricant bore 94 and lubricant passage 116 extend into exterior surface 120 in a true radial direction with respect to the center of housing 52 in a position so as to pass through a portion of return bore 92. Lubricant passage 116 need only break into return bore 92 to produce an opening sufficient to allow lubricant into return bore 92. Lubricant passage 116 extends all the way through to fluid bore 90. As such, a single axial passage connects inlet bore 90 and return bore 92. Lubricant passage 116 permits lubricant from lubricant fitting 58 to reach fluid inlet tube 16A inserted into inlet bore 90, and return tube 18A inserted into return bore 92 (FIG. 2). The lubricant improves the sealing between housing 52 and the tubes, as well as permits the tubes to be more easily removed from housing 52.

Vent bore 70 extends into exterior surface 120 at a position away from the thinnest portion of housing 52. In the embodiment shown, vent bore 70 extends through exterior surface 120 on the opposite side of return bore 92 as lubricant bore 116. Vent bore 70 comprises a blind hole that does not extend all the way through to inlet bore 90. Vent bore 70, however, intersects vent passage 118, which extends through to second axial end 88B (FIG. 5) of housing 52. In one embodiment, vent bore 70 and vent passage 118 intersect at a right angle. As such, vent passage 118 is positioned within collar 56 and is fluidly exposed to the interior of pour spout 66 and container 50 (FIG. 2). Vent passage 118 and vent bore 70 form a continuous passageway from the interior of container 50 to surrounding ambient air. Thus, air is permitted to enter container 50 to replace fluid leaving container through inlet bore 90.

The present invention provides an adapter that couples to pour spouts commonly found on fluid containers and fluid container lids. Specifically, a threaded collar includes thread sizes that match those of industry standard or state of the art pour spouts. Thus, the pour spout adapters of the present invention are convenient and easy to use. Additionally, the adapters of the present invention provide a sealed connection to suction tubes, fill tubes, return tubes and the like that are commonly found in pump systems. Such tubes are typically used to reach the bottom of the fluid container, but are typically only extended into the pour spout in an unsealed fashion such that debris can enter the container and liquid can accidentally leave the container outside of the tubes. The adapter of the present invention includes O-ring seals that are pushed into engagement with the tubes to form a seal. The sealed adapter prevents debris from entering the container and liquid from inappropriately leaving the container. The adapter of the present invention also includes a lubricant system that permits lubricant to reach tubes inserted into the adapter, thereby improving the seal therebetween. Further, the adapter of the present invention includes a vent system that also includes an air dryer that removes moisture from ambient air entering the fluid container to prevent vapor locking.

Although the present invention has been described with reference to preferred embodiments, workers skilled in the art will recognize that changes may be made in form and detail without departing from the spirit and scope of the invention.

The invention claimed is:

1. A pour spout adapter assembly comprising:
   a cylindrical housing extending from a first axial end to a second axial end, the cylindrical housing comprising:
      an inlet bore extending from the first axial end to the second axial end;
      a return bore extending from the first axial end to the second axial end;
      a vent passageway configured to allow air to pass through the housing and into a fluid container, the vent passageway comprising:
         a vent bore extending into the housing between the first axial end and the second axial end; and
         a vent passage that intersects the first vent bore and extends to the second axial end of the housing;
   a cap located at the first axial end of the housing to seal against the inlet and return bores; and
   a threaded collar rotatably joined to the second axial end of the housing and including internally located threads configured to allow the housing to be connected to a fluid container at a threaded pour spout.

2. The pour spout adapter assembly of claim 1, wherein the cap comprises:
   a cap body comprising:
      an annular tube for threading onto the housing; and
      a flange extending from the annular tube to extend over the first axial end of the housing; and
   a crush plate located within the cap body adjacent the annular tube and the flange, the crush plate comprising:
      a first bore to match and align with the inlet bore of the housing; and
      a second bore to match and align with the return bore of the housing.

3. The pour spout adapter assembly of claim 2 and further comprising:
   a first O-ring positioned between the crush plate and the first axial end of the housing.

4. The pour spout adapter assembly of claim 3 and further comprising:
   a first groove extending into the first axial end of the housing to surround the inlet bore and in which the first O-ring is positioned.

5. The pour spout adapter assembly of claim 3 and further comprising:
   a fluid inlet tube extending through the vent bore, the inlet bore, and the first O-ring;
   wherein the crush plate squeezes the first O-ring against the fluid inlet tube.

6. The pour spout adapter assembly of claim 3 and further comprising:
   a second O-ring positioned between the vent passage of the crush plate and the return bore of the housing.

7. The pour spout adapter assembly of claim 1, wherein the threaded collar comprises:
   an annular nut comprising:
      a first end having an internal bore with threads;
      a second end having a grooved flange; and
      a bearing face between the first and second ends positioned for engagement with the second axial end of the housing.

8. The pour spout adapter assembly of claim 7, wherein the housing further comprises:
   a bearing flange located adjacent the second axial end of the housing, the bearing flange engaging the bearing face of the threaded collar.

9. The pour spout adapter assembly of claim 8 and further comprising:
   a snap ring disposed in the grooved flange of the annular nut so as to maintain the bearing flange engaged with the bearing face.

10. The pour spout adapter assembly of claim 1, wherein the housing further comprises:
    a lubricant passage extending into the housing to intersect the inlet bore.

11. The pour spout adapter assembly of claim 10, wherein the lubricant passage includes a fitting for receiving a lubricant dispenser.

12. The pour spout adapter assembly of claim 1 and further comprising:
    an air dryer coupled to the vent bore of the vent passageway.

13. The pour spout adapter assembly of claim 12, wherein the air dryer comprises a desiccant tube.

14. A pour spout adapter comprising:
    a housing having a sealed inlet bore configured to receive a fluid inlet tube and a sealed return bore configured to receive a fluid return tube;
    a collar having an internal bore coupled to the housing at a rotatable connection so as to permit the fluid inlet tube and the fluid return tube to extend from the sealed inlet bore and the sealed return bore, respectively, through the collar;
    a threaded engagement disposed on the internal bore to receive a threaded pour spout of a fluid container to allow the collar to be connected to the fluid container at the threaded pour spout; and
    wherein the housing further comprises:
       a vent passageway configured to allow air to pass through the housing and into the fluid container, the vent passageway comprising:
          a vent bore extending into a side of the housing; and
          a vent passage intersecting and extending from the vent bore into the collar.

15. The pour spout adapter of claim 14, wherein the sealed bore comprises:
    a crush plate having first and second bores that mate with the sealed inlet and return bores, respectively;
    a cap that secures the crush plate to the housing; and first and second O-rings disposed between the sealed inlet and return bores and the first and second bores of the crush plate, respectively.

16. The pour spout adapter assembly of claim 15, wherein the cap includes an annular tube for threading to the first axial end of the housing.

17. The pour spout adapter of claim 14, wherein the rotatable connection comprises:
a bearing flange extending from the housing;
a bearing face extending from the internal bore of the collar positioned for engagement with the bearing flange of the housing;
a groove disposed in the internal bore of the collar; and
a retaining ring disposed in the groove to maintain the bearing flange engaged with the bearing face.

18. The pour spout adapter of claim 14 and further comprising:
an air dryer coupled to the inlet.

19. The pour spout adapter assembly of claim 18, wherein the air dryer a threaded connection for connecting the air dryer to the housing.

20. The pour spout adapter assembly of claim 19, wherein the air dryer further comprises:
a desiccant tube.

21. The pour spout adapter of claim 14 and further comprising:
a lubricant passage extending into a side of the housing to intersect the sealed inlet bore; and
a fitting coupled to the lubricant passage to receive a lubricant dispenser.

22. A pour spout adapter assembly comprising:
a cylindrical housing extending from a first axial end to a second axial end, the cylindrical housing comprising:
an inlet bore extending from the first axial end to the second axial end; and
a return bore extending from the first axial end to the second axial end;
a cap located at the first axial end of the housing to seal against the cylindrical housing;
a threaded collar rotatably joined to the second axial end of the housing, wherein the threaded collar comprises:
a first end having an internal bore with threads;
a second end having a grooved flange positioned for engagement with the second axial end of the housing; and
a bearing face between the first and second ends;
a fluid inlet tube that enters the inlet bore at the first axial end and exits the inlet bore at the second axial end;
a fluid return tube that enters the return bore at the first axial end and exits the return bore at the second axial end.

23. The pour spout adapter assembly of claim 22, wherein the housing further comprises a vent passageway comprising:
a vent bore extending into the housing between the first axial end and the second axial end; and
a vent passage that intersects the vent bore and extends to the second axial end of the housing.

24. The pour spout adapter assembly of claim 23, wherein the housing further comprises:
an air dryer connected to the first vent bore.

25. The pour spout adapter assembly of claim 24, wherein the air dryer further comprises:
a desiccant tube.

26. The pour spout adapter assembly of claim 22, wherein the cap comprises a cap body including an annular tube for threading to the first axial end of the housing.

* * * * *